US008683053B2

(12) United States Patent
Asveren et al.

(10) Patent No.: US 8,683,053 B2
(45) Date of Patent: Mar. 25, 2014

(54) METHODS AND APPARATUS FOR ESTABLISHING SECURE COMMUNICATIONS BETWEEN CLIENT COMPUTING DEVICES THAT USE TRANSPORT AND SECURITY PROTOCOLS

(75) Inventors: Tolga Asveren, Bordentown, NJ (US); Mark Duffy, Lexington, MA (US); Nagesh Kumar Bollapalli, Bangalore (IN); Shambhu Dayal Rai, Bangalore (IN); Dilnawaj Ahmed, Bangalore (IN)

(73) Assignee: Sonus Networks, Inc., Westford, MA (US)

( * ) Notice: Subject to any disclaimer, the term of this patent is extended or adjusted under 35 U.S.C. 154(b) by 518 days.

(21) Appl. No.: 12/979,850

(22) Filed: Dec. 28, 2010

(65) Prior Publication Data

US 2012/0166656 A1    Jun. 28, 2012

(51) Int. Cl.
*G06F 13/00* (2006.01)
(52) U.S. Cl.
USPC ............................................. 709/228
(58) Field of Classification Search
USPC .................................. 709/228, 230
See application file for complete search history.

(56) References Cited

U.S. PATENT DOCUMENTS

| 7,565,526 B1 | 7/2009 | Shaw et al. ................ 713/150 |
| 8,214,884 B2 * | 7/2012 | Xia et al. ........................ 726/5 |
| 2005/0108411 A1 | 5/2005 | Kliland et al. ............... 709/230 |
| 2005/0210292 A1 | 9/2005 | Adams et al. ................ 713/201 |
| 2009/0125633 A1 * | 5/2009 | Watsen et al. ............... 709/229 |
| 2009/0158032 A1 * | 6/2009 | Costa et al. .................. 713/156 |

OTHER PUBLICATIONS

Yon, D. et al., "TCP-Based Media Transport in the Session Description Protocol (SDP)," *RFC 4145*, (Sep. 2005), 14 pgs.
Lennox, J., "Connection-Oriented Media Transport over the Transport Layer Security (TLS) Protocol (SDP)," *RFC 4571*, (Jul. 2006), 13 pgs.

* cited by examiner

*Primary Examiner* — Robert B Harrell
(74) *Attorney, Agent, or Firm* — Straub & Pokotylo; Michael P. Straub; Stephen P. Straub (57) ABSTRACT

Methods and apparatuses, including computer program products, are described for establishing secure communications sessions between computing devices located behind network security devices. The method includes receiving, from a first client computing device, a request for a secure connection with a second client computing device, the request including a first transport protocol role and a first security protocol role associated with the first device. The method includes transmitting the request to the second device. The method includes receiving, from the second device, a response to the request including a second transport protocol role and a second security protocol role associated with the second device, transmitting the response to the first device, and establishing the secure connection between the first device and the second device, where the first and second security protocol roles are determined independently from the first and second transport protocol roles.

20 Claims, 5 Drawing Sheets

METHODS AND APPARATUS FOR ESTABLISHING SECURE COMMUNICATIONS BETWEEN CLIENT COMPUTING DEVICES THAT USE TRANSPORT AND SECURITY PROTOCOLS

FIELD OF THE INVENTION

The subject matter of this application relates generally to methods and apparatuses, including computer program products, for establishing secure communications between client computing devices located behind network security devices.

BACKGROUND OF THE INVENTION

The growth of Internet Protocol (IP)-based networks as carriers for various types of digital communications has led to the advent of application protocols used to negotiate and define the parameters of a communications session between two peer computing devices. One example of such an application protocol is Session Initiation Protocol (SIP), commonly used for establishing and managing Voice-over-IP (VoIP) connections. As a corollary to the introduction of application protocols like SIP, other protocols have been created to add a layer of description to enable the respective participants in a communications session to understand and share the properties and parameters (e.g., media type, IP address, transport protocol, encryption key) of the session. An example of this type of description protocol is Session Description Protocol (SDP).

The set of properties and parameters used in SDP are often called a session profile. SDP also uses attributes to extend the core session protocol. For example, attributes are defined to assign a client or server role to each peer device. A peer device with the client role initiates the connection, and the peer device with the server role waits for an initial connection establishment message from the client device.

Along with the rise of IP-based networks and digital communications has come the need to protect such networks and the devices that reside on them from security vulnerabilities and attacks. To provide for secure communications, many private communication networks connect to public networks (e.g., Internet) using a network security device, such as a firewall device, a Network Address Translation (NAT) device, or a computing device executing software that performs firewall, NAT, and/or other security functions. Generally, these types of network security devices mask the local addresses of client devices within the private network. In addition, these security devices prevent unsolicited inbound communications from reaching the client devices, for example, by requiring client devices located behind a NAT or firewall device to act as clients (e.g., initiate connections) or by not enabling the client devices located behind the NAT or firewall device to act as servers from a transport protocol establishment perspective.

Figure 1:
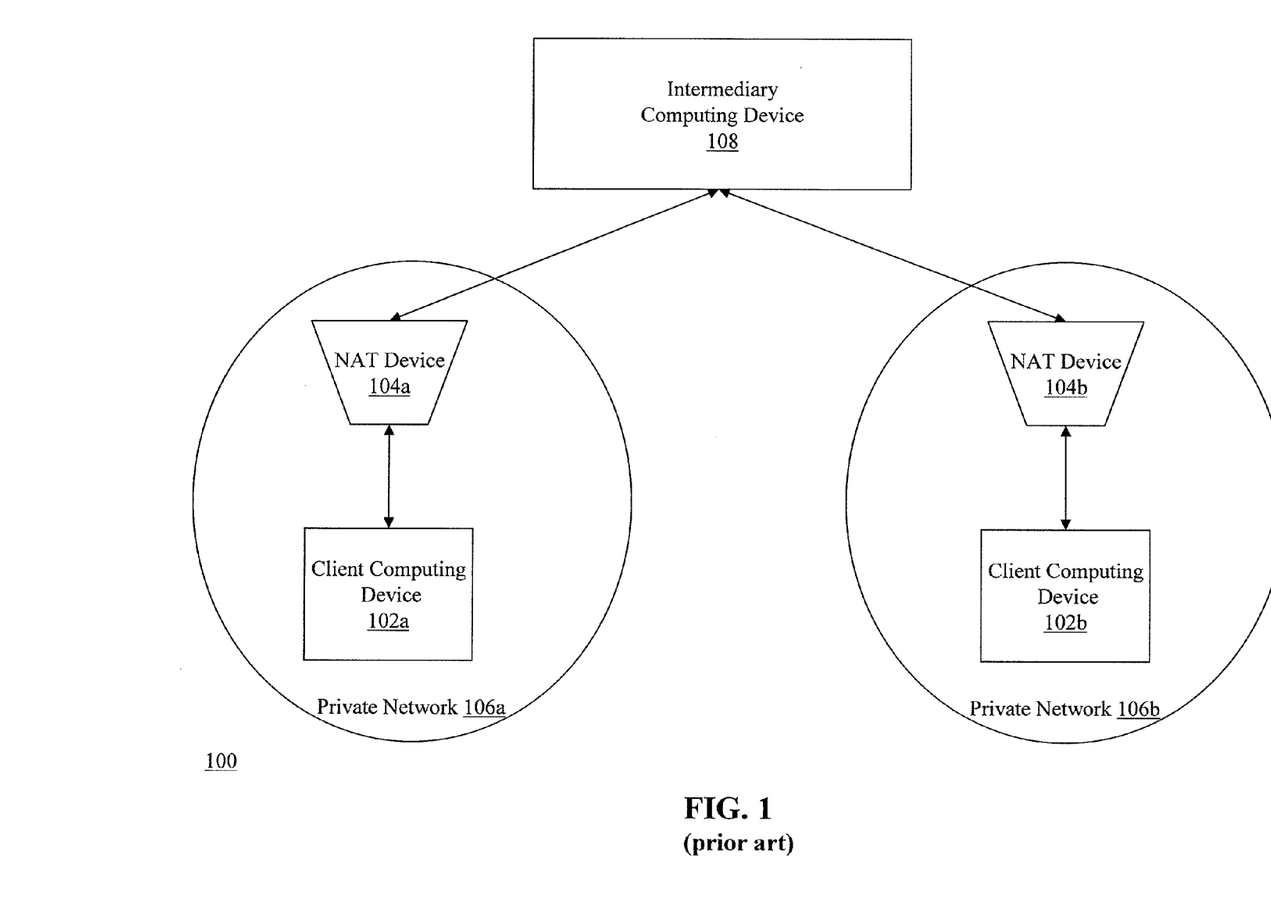
FIG. 1 is a block diagram illustrating a typical network configuration for providing secure communications between private communications networks.

FIG. 1 is a block diagram illustrating a typical network configuration 100 for providing secure communications between private communications networks. The configuration 100 includes two client computing devices 102a and 102b, two NAT devices 104a and 104b, located within private networks 106a and 106b, respectively, which act as an interface between the client computing devices 102a and 102b and the intermediary device 108. As shown in FIG. 1, client computing device 102a in private network 106a establishes a transport connection (e.g., Transmission Control Protocol (TCP) connection) with client computing device 102b by communicating with NAT device 104a, which transmits the communication via intermediary device 108 to NAT device 104b in private network 106b and then to client computing device 102b.

IP-based networks utilize the Internet Protocol and transport protocols like User Datagram Protocol (UDP), Stream Control Transmission Protocol (SCTP), and TCP to transfer the data between the applications on two nodes. The IP layer solves the problem of identifying and routing the packets from one node to another node. The Transport layer provides end-to-end message transfer capabilities independent of the underlying network, along with error control, segmentation, flow control, congestion control, and application addressing (port numbers). End-to-end message transmission for connecting applications at the transport layer can be categorized as either connection-oriented, implemented in TCP, or connectionless, implemented in UDP.

A frequently-used technique to provide security for such transport connections is the Transport Layer Security (TLS) protocol. Generally, TLS provides for the establishment of secure connection-oriented transport sessions on top of transport protocols such as TCP. VoIP application layer protocols such as SIP and SDP may run on top of TLS in order to provide security for those VoIP application layer protocols. Uses of the TLS protocol typically require that the role (e.g., client) assumed by a given device during the establishment of a TLS connection is the same as the role assumed by that peer device during the establishment of the underlying TCP connection.

If a device (e.g. client computing device 102a, 102b) is located behind a NAT device (e.g. NAT device 104a, 104b), it needs to act as a client from a TCP connection establishment perspective because most NAT or firewall devices do not allow through an IP packet intended to establish a new TCP connection to the client device. However, most NAT devices do allow IP packets to the client device if the IP packets are sent in the context of a TCP connection initiated by the client device. Therefore, when two devices (e.g., client computing devices 102a and 102b) connecting via TCP are located behind respective security devices (e.g., NAT devices 104a and 104b), both peer devices are forced by the security devices to assume the role of client. However, the TCP protocol prevents two devices from establishing a connection where both devices have the client role, so the intermediary device 108 is required to facilitate the TCP connection.

Figure 2:
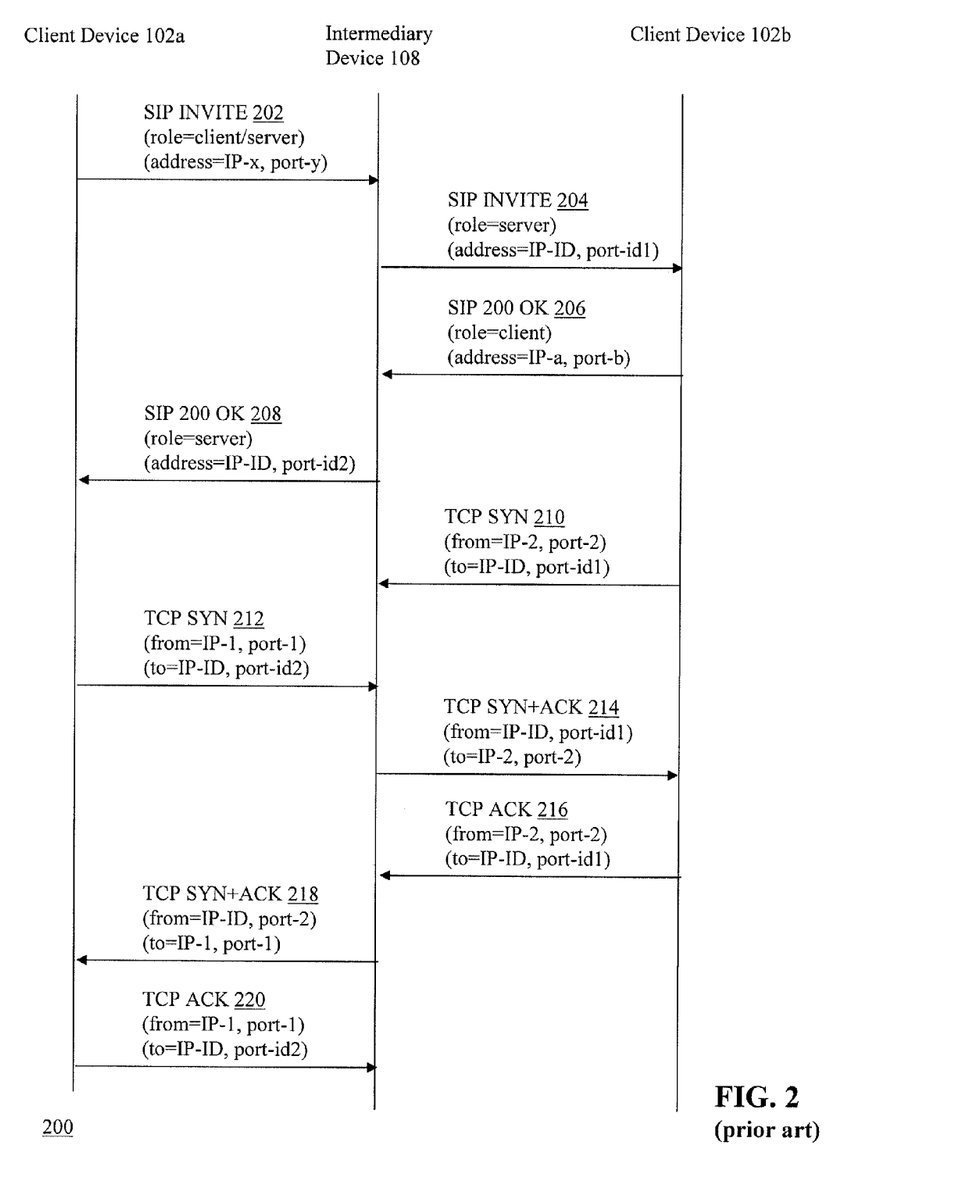
FIG. 2 is a sequence diagram illustrating a technique for using SIP and SDP to establish a TCP media connection between two client devices that are located behind NAT devices. This technique is known as TCP stitching.

FIG. 2 is a flow diagram illustrating a technique for using SIP and SDP to establish a TCP media session between two client devices that are located behind NAT devices. One of the methods of establishing the TCP connection, facilitated by the intermediary device 108, is known as TCP stitching. The techniques described herein relate to the establishment of a secure transport connection (e.g., TCP media connection) for media transport. Establishing signaling connectivity needed to set up a TCP media connection can be achieved in various ways and is outside the scope of the invention.

The client computing device 102a transmits a request message (e.g., SIP INVITE 202) to intermediary device 108 via the NAT device 104a. The SDP content in the SIP INVITE message 202 specifies a TCP role (e.g., client or server) and an IP address (e.g., 'x') and port (e.g., 'y') associated with the client device 102a. The intermediary device 108 replaces the IP address and port in the SDP content of the SIP INVITE message 204 with the intermediary device's 108 own IP address (e.g., 'ID') and port (e.g., 'id1'). The intermediary device 108 also sets the TCP role specified in the SIP INVITE message 204 to indicate a server role for the intermediary device 108. The intermediary device 108 then forwards the modified SIP INVITE message 204 to the client computing device 102b via the NAT device 104b.

Upon receiving the modified SIP INVITE message 204 from the intermediary device 108, the client computing device 102b selects the role of client for establishment of the TCP media connection and transmits a response message (e.g., SIP 200 OK message 206, a SIP 183 (Session Progress) message) back to the intermediary device 108. The SDP content in the SIP 200 OK message 206 includes a TCP role indicating the client role for the client computing device 102b and an IP address (e.g., 'a') and port (e.g., 'b') associated with the client device 102b.

The intermediary device 108 replaces the IP address and port of the SDP content in the SIP 200 OK message 208 with the intermediary device's 108 own IP address and port. The intermediary device 108 also sets the TCP role of the SIP 200 OK message 208 to indicate a server role for the intermediary device 108, and forwards the modified SIP 200 OK message 208 to the client computing device 102a via the NAT device 104a. Upon receiving the modified SIP 200 OK message 208 from the intermediary device 108, the client computing device 102a assumes the role of client for establishment of the TCP media connection. At this point, both client computing devices 102a and 102b are assigned the role of client for purposes of establishing a TCP media connection.

Both client computing device 102a and client computing device 102b transmit a TCP synchronize (SYN) message (e.g., messages 210 and 212) to intermediary device 108 because, as TCP clients, they initiate the connection. The SYN messages 210 and 212 each include an IP address and port associated with the respective client computing devices 102a and 102b from which the SYN messages 210 and 212 originated. When the SYN messages 210 and 212 pass through the respective NAT devices 104a and 104b, the SYN messages 210 and 212 are modified to include the IP address and port of the NAT devices 104a and 104b to be used for this particular NAT binding. The intermediary device 108 stores the source IP address and port, among other attributes, related to the SYN message 210 received from client computing device 102b and drops the SYN message 210.

Similarly, the intermediary device 108 stores the source IP address and port related to the SYN message 212 received from client computing device 102a. The intermediary device 108 rewrites the address fields of the SYN message 212 received from the client computing device 102a based on what the intermediary device 108 has learned from the client computing devices 102a and 102b. For example, the intermediary device 108 rewrites the source IP address and port of the SYN message 212 to be the IP address and port of the intermediary device 108 instead of the IP address and port associated with the client computing device 102a. Similarly, the intermediary device 108 rewrites the destination IP address and port of the SYN message 212 to be the IP address and port associated with the client computing device 102b. The intermediary device 108 also sets the TCP ACK bit in the modified TCP message 214 and transmits it via the NAT device 104b to the client computing device 102b.

Upon receiving the rewritten SYN+ACK message 214 from the intermediary device 108, the client computing device 102b responds with an acknowledgement (ACK) message 216. The intermediary device 108 rewrites the IP address and port fields of the ACK message 216 to direct the message 216 to the client computing device 102a, and also adds information based on the data stored from the SYN message 210 previously received from client computing device 102b. The intermediary device 108 transmits the SYN+ACK message 218 to the client computing device 102a, and the device 102a responds with an ACK message 220. From this point forward, the TCP media connection between the client computing devices 102a and 102b is established, and the intermediary device 108 continues to rewrite the source and destination IP addresses and ports of messages that pass through the intermediary device 108 between the client computing devices 102a and 102b.

Although TCP stitching addresses the issue of establishing TCP media connections when the two client devices are located behind network security devices such as NAT devices, TCP stitching does not provide a solution for establishing TLS connections because the TCP roles (e.g., client, server) assumed by the client devices dictate their TLS roles. Therefore, when both client devices are clients from a TCP perspective, the client devices also assume the client role from a TLS perspective. This configuration presents a conflict with the TLS connection handshake protocol because it requires that one TLS client and one TLS server establish a TLS connection. What is needed is a technique for establishing a TLS connection between two TCP client devices that are located behind network security devices without the TLS layer roles being limited to the TCP layer roles defined for each client device.

SUMMARY OF THE INVENTION

In general overview, the techniques described herein are related to establishing secure communications sessions between client computing devices located behind network security devices. The techniques advantageously provide for the establishment of a TLS connection by decoupling the TCP roles of the respective client devices from the TLS roles of the client devices. The result is a more flexible and extensible mechanism for establishing secure transport connections without the limitation of TLS role selection being dictated by TCP role selection. The techniques overcome the problem of connecting, via TCP and TLS, client devices that are located behind network security devices (e.g., NAT devices) because those client devices are otherwise constrained to act only as clients from a TCP perspective.

The invention, in one aspect, features a method for establishing secure communications sessions between client computing devices located behind network security devices. A computing device receives, from a first client computing device, a request for a secure connection with a second client computing device, the request including a first transport protocol role associated with the first client computing device and a first security protocol role associated with the first client computing device. The computing device transmits the request to the second client computing device. The computing device receives, from the second client computing device, a response to the request including a second transport protocol role associated with the second client computing device and a second security protocol role associated with the second client computing device, the second security protocol role being different from the first security protocol role. The computing device transmits the response to the first client computing device and establishes the secure connection between the first client computing device and the second client computing device, where the first transport protocol role and the second transport protocol role are determined independently from the first security protocol role and the second security protocol role.

The invention, in another aspect, features a system for establishing secure communications sessions between client computing devices located behind network security devices. The system includes a computing device configured to receive, from a first client computing device, a request for a secure connection with a second client computing device. The request includes a first transport protocol role associated with the first client computing device and a first security protocol role associated with the first client computing device. The computing device is also configured to transmit the request to the second client computing device. The computing device is also configured to receive, from the second client computing device, a response to the request. The response includes a second transport protocol role associated with the second client computing device and a second security protocol role associated with the second client computing device. The computing device is also configured to transmit the response to the first client computing device, and establish the secure connection between the first client computing device and the second client computing device, where the first transport protocol role and the second transport protocol role are determined independently from the first security protocol role and the second security protocol role.

The invention, in another aspect, features a computer program product, tangibly embodied in a computer-readable storage medium, for establishing secure communications sessions between client computing devices located behind network security devices. The computer program product includes instructions operable to cause a data processing apparatus to receive, at a computing device from a first client computing device, a request for a secure connection with a second client computing device. The request includes a first transport protocol role associated with the first client computing device and a first security protocol role associated with the first client computing device. The computer program product also includes instructions operable to cause the data processing apparatus to transmit the request to the second client computing device and receive, from the second client computing device, a response to the request, the response including a second transport protocol role associated with the second client computing device and a second security protocol role associated with the second client computing device, the second security protocol role being different from the first security protocol role. The computer program product also includes instructions operable to cause the data processing apparatus to transmit the response to the first client computing device and establish the secure connection between the first client computing device and the second client computing device, where the first transport protocol role and the second transport protocol role are determined independently from the first security protocol role and the second security protocol role.

In some embodiments, any of the above aspects can include one or more of the following features. In some embodiments, a transport connection is established between the first client computing device and the second client computing device via the computing device. In some embodiments, establishing the transport connection includes assigning a client role to the first transport protocol role, assigning a client role to the second transport protocol role, and assigning a server role to a transport connection role associated with the computing device. In some embodiments, establishing a transport connection includes receiving, at the computing device from the first client computing device, a request for a transport connection with the second client computing device, transmitting, from the computing device, the request to the second client computing device, receiving, at the computing device from the second client computing device, a response to the request, and transmitting, from the computing device, the response to the first client computing device.

In some embodiments, the transport connection is established using Transmission Control Protocol (TCP). In some embodiments, the transport connection is established using TCP stitching. In some embodiments, establishing the transport connection includes receiving, at the computing device from the first client computing device, a first synchronize (SYN) message including a first Internet Protocol (IP) address and a first port number associated with the first client computing device, receiving, at the computing device from the second client computing device, a second SYN message including a second IP address and a second port number associated with the second client computing device, modifying, at the computing device, (i) a source IP address and a source port number of the first SYN message to include an IP address and a port number of the computing device and (ii) a destination IP address and a destination port number of the first SYN message to include the second IP address and the second port number, and transmitting, from the computing device, the modified first SYN message to the second computing device.

In some embodiments, the first security protocol role is a client role and the second security protocol role is a server role. In some embodiments, the first security protocol role is a server role and the second security protocol role is a client role. In some embodiments, the first security protocol role is a client/server role and the second security protocol role is one of a client role or a server role. In some embodiments, the second security protocol role is determined according to a preconfigured value. In some embodiments, the first security protocol role is assigned a client role if the security protocol role associated with the second client computing device is a server role. In some embodiments, the first security protocol role is assigned a server role if the second security protocol role is a client role.

In some embodiments, the secure connection is established using Transport Layer Security (TLS). In some embodiments, the transport protocol role is encoded within a Session Description Protocol (SDP) attribute. In some embodiments, the security protocol role is encoded within an SDP attribute. In some embodiments, the request for a secure connection is encoded within a Session Initiation Protocol (SIP) INVITE message. In some embodiments, the response to the request for a secure connection is encoded within a SIP 200 OK message or a SIP 18x response message.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 3:
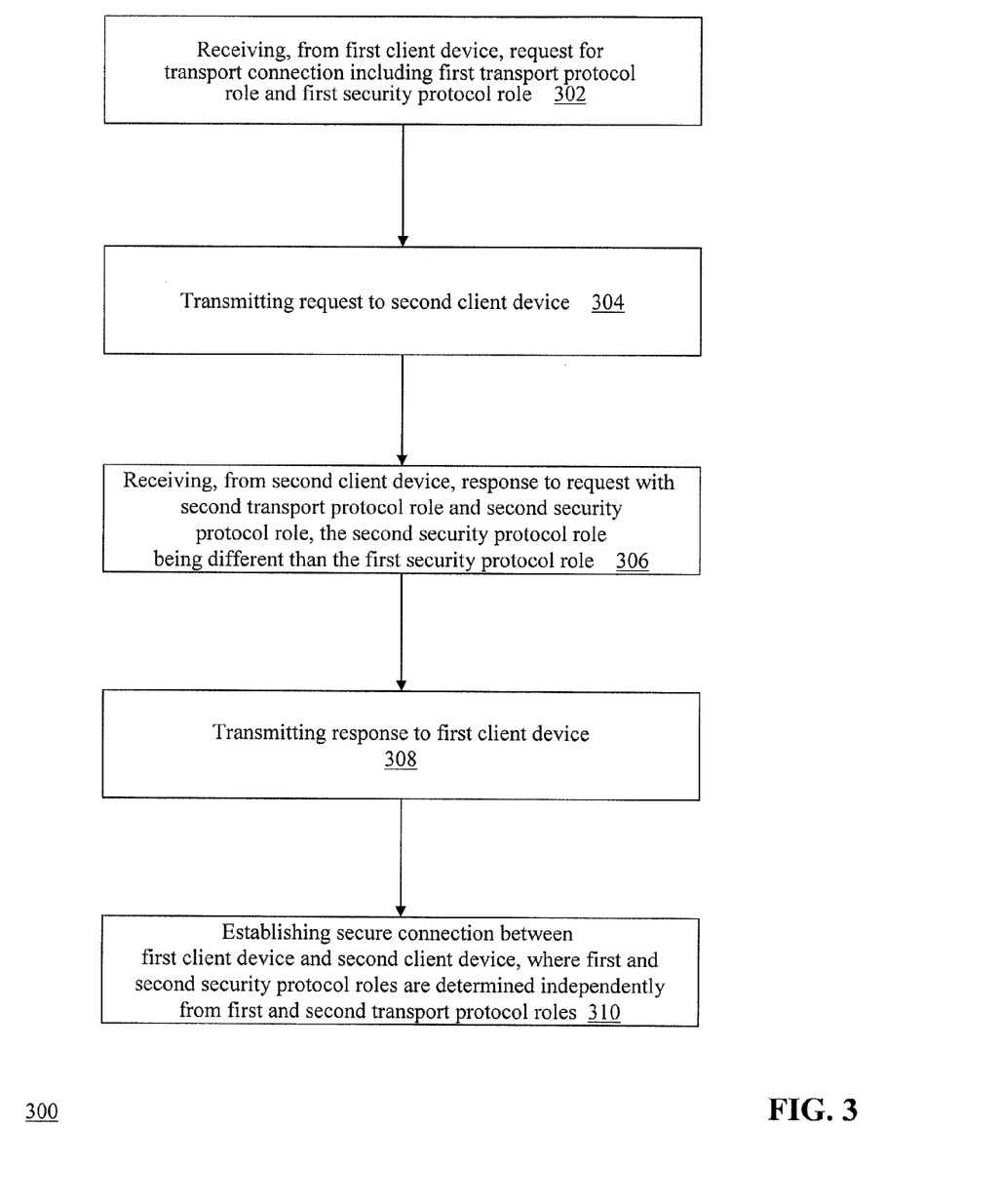
FIG. 3 is a flow diagram of a process for establishing secure communications sessions between client computing devices located behind network security devices via an intermediary device.

FIG. 3 is a flow diagram of a process 300 for establishing secure communications sessions between client computing devices (e.g., client computing devices 102a and 102b of FIG. 1) located behind network security devices (e.g., NAT devices 104a and 104b of FIG. 1) via a computing device (e.g., intermediary device 108 of FIG. 1). Although FIG. 3 shows intermediary device 108 interposed between the first client computing device 102a and the second client computing device 102b, it should be understood that other architectures and network configurations may be employed.

The intermediary device 108 receives (302), from the first client computing device 102a, a request for a secure connection to the second client computing device 102b. The request includes a first transport protocol role and a first security protocol role to which the first client computing device 102a is assigned. The first transport protocol role is associated with the role (e.g., client, server) which the first client computing device 102a performs in the transport connection with the second client computing device 102b. The first security protocol role 403b is associated with the role (e.g., client, server), which the first client computing device 102a performs in the security connection with the second client computing device 102b.

In some embodiments, the intermediary device establishes a transport connection between the first client computing device 102a and the second client computing device 102b. Due to their location behind network security devices (e.g., NAT devices 104a and 104b, respectively), the first client computing device 102a and the second client computing device 102b are negotiated as performing the client role for the transport connection, while the intermediary device 108 performs the server role for the transport connection.

Upon receiving the request from the first client computing device 102a, the intermediary device 108 transmits (304) a request to the second client computing device 102a. The intermediary device 108 then receives (306), from the second client computing device 102b, a response to the request. The response from the second client computing device 102b includes a second transport protocol role associated with the second client computing device 102b and a second security protocol role associated with the second client computing device 102b. The intermediary device 108 transmits (308) the response to the first client computing device 102a.

The intermediary device 108 then establishes (310) a secure connection between the first client computing device 102a and the second client computing device 102b (e.g., via the intermediary device 108). The first security protocol role (e.g., client) associated with the first client computing device 102a and the second security protocol role (e.g., server) associated with the second client computing device 102b are determined independently from the first transport protocol role (e.g., client) associated with the first client computing device 102a and the second transport protocol role (e.g., client) associated with the second client computing device 102b.

Figure 4:
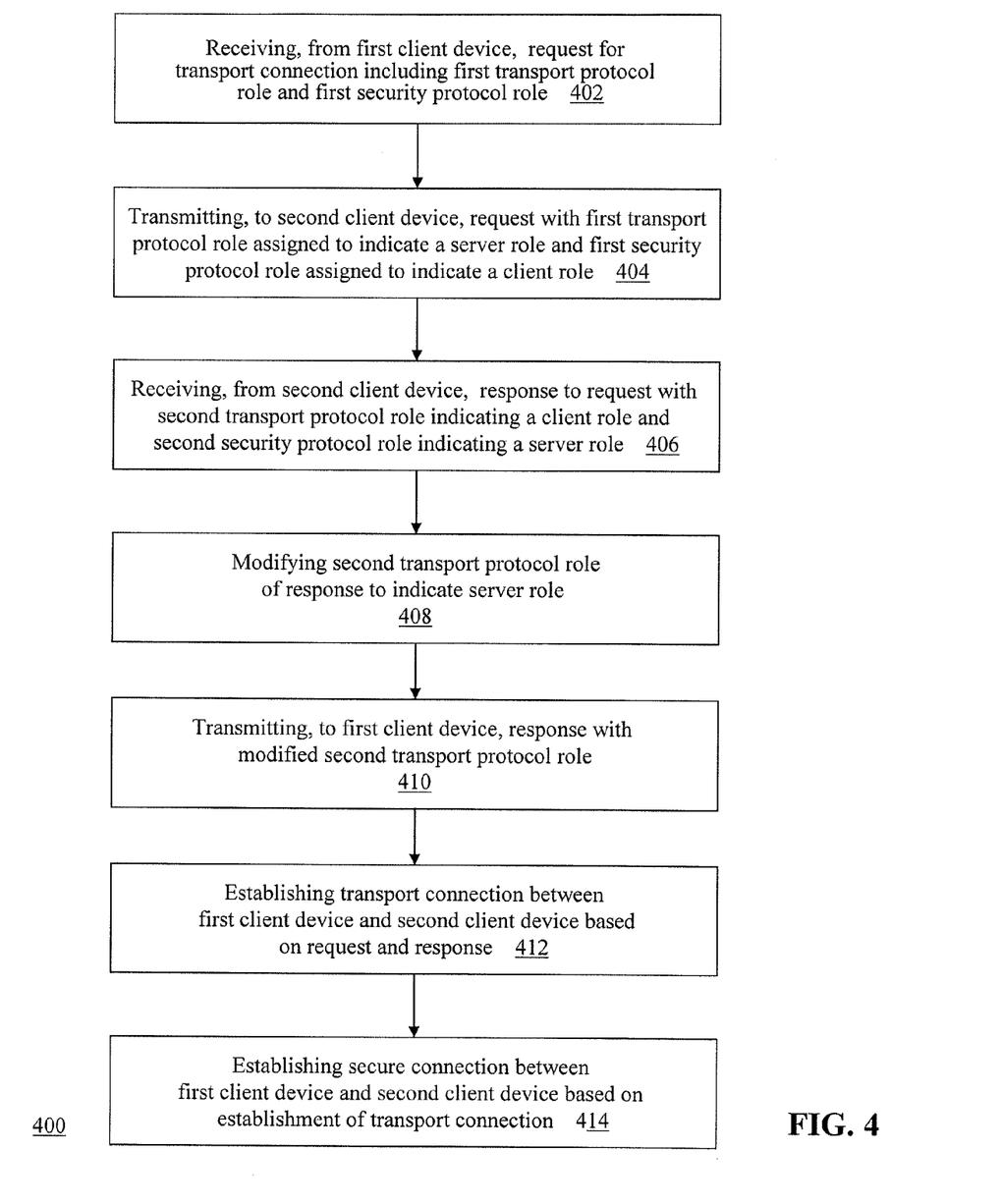
FIG. 4 is a detailed flow diagram of a process for establishing secure communications sessions between client computing devices located behind network security devices via an intermediary device.
Figure 5:
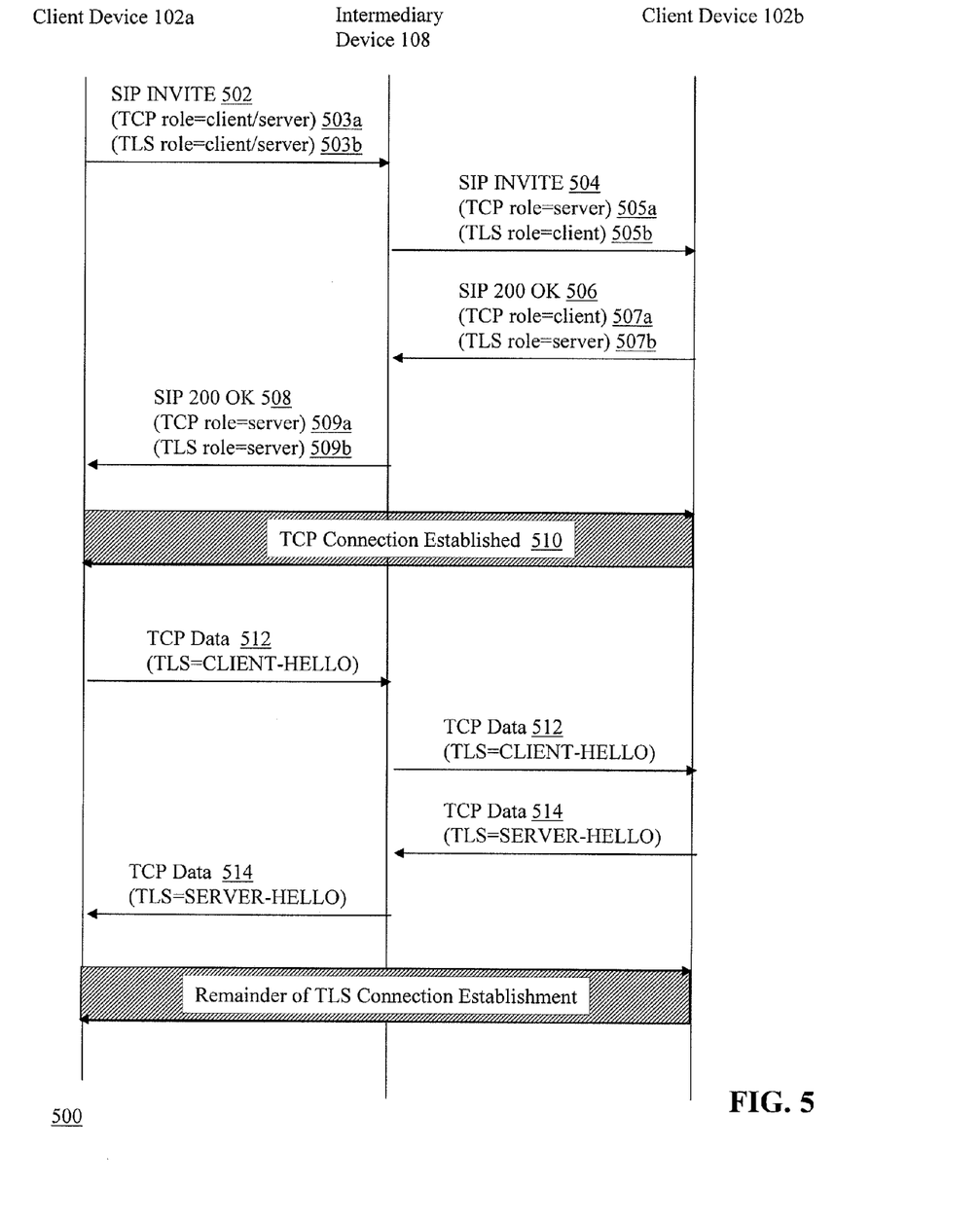
FIG. 5 is a sequence diagram of a process for establishing secure communications sessions between client computing devices located behind network security devices.

FIG. 4 is a detailed flow diagram of a process 400 for establishing secure communications sessions between client computing devices (e.g., client computing devices 102a and 102b of FIG. 1) located behind network security devices (e.g., NAT devices 104a and 104b of FIG. 1) via an intermediary device (e.g., intermediary device 108 of FIG. 1). FIG. 5 is a sequence diagram of a process 500 for establishing secure communications between client computing devices located behind network security devices in conjunction with the flow diagram of FIG. 4.

The intermediary device 108 receives (402), from the first client computing device 102a, a request (e.g., SIP INVITE request 502) for a transport connection to the second client computing device 102b. The request includes a first transport protocol role (e.g., TCP role 503a) and a first security protocol role (e.g., TLS role 503b). The first transport protocol role 503a is associated with the role (e.g., client, server), which the first client computing device 102a performs in the transport connection with the second client computing device 102b. The first security protocol role 503b is associated with the role (e.g., client, server), which the first client computing device 102a performs in the security connection with the second client computing device 102b.

For example, the transport protocol role 503a and the security protocol role 503b can be defined as attributes of the SDP message attached to the initial SIP INVITE message 502 originated by the first client computing device 102a and transmitted to the intermediary device 108. In another example, the transport protocol role 503a and the security protocol role 503b can be defined as parameters of attributes of the SDP message attached to the initial SIP INVITE message 502.

In some embodiments, the initial request message 502 received from the first client computing device 102a includes TCP role 503a that indicates the first client computing device 102a can act as either client or server (e.g., "client/server") for the purpose of establishing a TCP connection. In some embodiments, the initial request message 502 received from the first client computing device 102a includes TLS role 503b that indicates the first client computing device 102a can act as either client or server (e.g., "client/server") for the purpose of establishing a TLS connection. In some embodiments, the TCP role 503a and TLS role 503b are predefined to indicate a particular role.

Upon receiving the request 502 from the first client computing device 102a, the intermediary device 108 transmits (404) a request 504 to the second client computing device 102b. As part of the transmission, the intermediary device 108 assigns the first transport protocol role 505a of the request 504 to indicate a server role for the first client computing device 102a and assigns (404) the first security protocol role 505b to indicate a client role for the first client computing device 102a.

The intermediary device 108 then receives (406), from the second client computing device 102b, a response 506 to the request 504. Based on the first transport protocol role 505a (e.g., "server") transmitted in the request to the second client computing device 102b, the response 506 from the second client computing device 102b includes a second transport protocol role 507a indicating a client role for the second client computing device 102b. Also, based on the first security protocol role 505b (e.g., "client") transmitted in the request 504, the response 506 from the second client computing device 102b includes a second security protocol role 507b indicating a server role for the second client computing device 102b. At this point, the first security protocol role 505b and the second security protocol role 507b have different values, indicating that the first client computing device acts as the client and the second client computing device acts as the server in the context of establishing a TLS connection.

Because the client computing devices 102a and 102b are located behind NAT devices 104a and 104b respectively, the client computing devices 102a and 102b act as clients from a transport connection perspective. Therefore, the intermediary device 108 modifies (408) the second transport protocol role 507a of the response 506 received from the second client computing device 102b (e.g., changing it from "client" to "server") to indicate to the first client computing device 102b that the response 506 is transmitted by a computing device performing a server role.

The intermediary device 108 transmits (410) a response 508 with the modified second transport protocol role 509a to the first computing device 102a. The modified transport protocol role 509a contains the server role and the first client computing device 102a assumes the client role—thereby maintaining its client status for the transport connection as required by the first device's 102a location behind the NAT device 104a.

In addition, the second security protocol role 509b of the response 508 indicates to the first client computing device 102a that the second client computing device 102b has assumed the server role for the purpose of establishing a secure (e.g., TLS) connection. Based on the response, the first client computing device 102a assumes the client role for the purpose of establishing the secure connection.

Now that the first client computing device 102a and the second client computing device 102b are negotiated as clients to the intermediary device 108 for the purpose of establishing a transport connection, the first client computing device 102a establishes (412) a transport connection 510 to the second client computing device 102b via the intermediary device 108. For example, the intermediary device 108 can use the TCP stitching technique described above to establish the transport connection between the client computing devices 102a and 102b.

Once the transport connection is established, the first client computing device 102a and the second client computing device 102b establish (414) a secure connection via the intermediary device 108. The first client computing device 102a, as the client for the secure connection, transmits a TLS Client Hello message 512 to the intermediary device 108, and the intermediary device 108 sends the TLS Client Hello message 512 on to the second client computing device 102b. Because the second client computing device 102b has assumed the server role for the secure connection, the second client computing device 102b transmits a TLS Server Hello message 514 back to the intermediary device 108 in response to the TLS Client Hello message 512. The intermediary device 108 sends the TLS Server Hello message 514 back to the first client computing device 102a as part of the establishment of the TLS connection. The TLS connection handshake continues with additional messages between the first client computing device 102a and the second client computing device 102b to complete the establishment of the TLS connection.

Example Use Case

As one example of the techniques described above, the SIP INVITE request received at the intermediary device 108 from the first client computing device 102a can include an SDP message with an additional attribute:

1tls-setup-attr=actpass

The inclusion of this attribute into the SDP message requires that the first client computing device 102a and the second client computing device 102b support the attribute with the following definition:

tls-setup-attr="a=setup:" role
role="active"/"passive"/"actpass"
"active:" the client device initiates an outgoing connection.
"passive:" the client device accepts an incoming connection.
"actpass:" the client device can accept an incoming connection or initiate an outgoing connection.

Similarly, when the second client computing device 102b receives the SIP INVITE request containing the tls-setup-attr attribute, the second client computing device 102b returns a SIP 200 OK response with an SDP message containing the tls-setup-attr attribute, which accounts for the value of the tls-setup-attr attribute received in the SIP INVITE request:

If the received tls-setup-attr="active", the returned tls-setup-attr ="passive."

If the received tls-setup-attr="passive", the returned tls-setup-attr ="active."

If the received tls-setup-attr="actpass", the returned tls-setup-attr ="active" or "passive."

Example message flows between the first client computing device 102a, the intermediary device 108, and the second client computing device 102b for establishing a TLS connection using the tls-setup-attr attribute include:

1) The intermediary device 108 receives from the first client computing device 102a a SIP INVITE message containing an SDP message with the tls-setup-attr attribute set to "active" and sends the SIP INVITE message to the second client computing device 102b with the tls-setup-attr attribute set to "active." The intermediary device 108 receives from the second client computing device 102b a SIP 200 OK message containing an SDP message with the tls-setup-attr attribute set to "passive" and sends the SIP 200 OK message to the first device 102a. A TCP connection is established between the first client computing device 102a and the second client computing device 102b via the intermediary device 108. The first device 102a initiates a TLS connection with the second device 102b by sending a TLS Client Hello message to the second device 102b after the TCP connection is established. The second device 102b waits for receipt of the TLS Client Hello message.

2) The intermediary device 108 receives from the first client computing device 102a a SIP INVITE message containing an SDP message with the tls-setup-attr attribute set to "passive" and sends the SIP INVITE message to the second client computing device 102b with the tls-setup-attr attribute set to "passive." The intermediary device 108 receives from the second client computing device 102b a SIP 200 OK message containing an SDP message with the tls-setup-attr attribute set to "active" and sends the SIP 200 OK message to the first device 102a. A TCP connection is established between the first client computing device 102a and the second client computing device 102b via the intermediary device 108. The second device 102b initiates a TLS connection with the first device 102a by sending a TLS Client Hello message to the first device 102a after the TCP connection is established. The first device 102a waits for receipt of the TLS Client Hello message.

3) The intermediary device 108 receives from the first client computing device 102a a SIP INVITE message containing an SDP message with the tls-setup-attr attribute set to "actpass" and sends the SIP INVITE message to the second client computing device 102*b* with the tls-setup-attr attribute set to "actpass." The intermediary device 108 receives from the second client computing device 102*b* a SIP 200 OK message containing an SDP message with the tls-setup-attr attribute set to "active" and sends the SIP 200 OK message to the first device 102*a*. A TCP connection is established between the first client computing device 102*a* and the second client computing device 102*b* via the intermediary device 108. The second device 102*b* initiates a TLS connection with the first device 102*a* by sending a TLS Client Hello message to the first device 102*a* after the TCP connection is established. The first device 102*a* waits for receipt of the TLS Client Hello message.

4) The intermediary device 108 receives from the first client computing device 102*a* a SIP INVITE message containing an SDP message with the tls-setup-attr attribute set to "actpass" and sends the SIP INVITE message to the second client computing device 102*b* with the tls-setup-attr attribute set to "actpass." The intermediary device 108 receives from the second client computing device 102*b* a SIP 200 OK message containing an SDP message with the tls-setup-attr attribute set to "passive" and sends the SIP 200 OK message to the first device 102*a*. A TCP connection is established between the first client computing device 102*a* and the second client computing device 102*b* via the intermediary device 108. The first device 102*a* initiates a TLS connection with the second device 102*b* by sending a TLS Client Hello message to the second device 102*b* after the TCP connection is established. The second device 102*b* waits for receipt of the TLS Client Hello message.

The above examples assume that the client computing devices 102*a* and 102*b* have the appropriate security credentials (e.g., a digital certificate) to act in a particular role for establishment of a TLS connection. Also, the above examples assume that the client computing devices 102*a* and 102*b* are prepared to act in a particular role for establishment of a TLS connection. If these conditions are not met by the client computing devices 102*a* and 102*b*, the offer for a TLS connection should be rejected. The role negotiation based on tls-setup-attr provides flexibility to accommodate cases where one or the other of the client computing devices may be unable to act in a given TLS role.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for establishing secure communications sessions between client computing devices located behind network security devices, the method comprising:
   (a) receiving, at a intermediary computing device from a first client computing device, a request for a secure connection with a second client computing device, the request including a first transport protocol role implemented by the first client computing device and a first security protocol role implemented by the first client computing device;
   (b) transmitting, from the intermediary computing device, the request to the second client computing device;
   (c) receiving, at the intermediary computing device from the second client computing device, a response to the request, the response including a second transport protocol role implemented by the second client computing device and a second security protocol role implemented by the second client computing device, the second security protocol role being different from the first security protocol role;
   (d) transmitting, from the intermediary computing device, the response to the first client computing device;
   (e) establishing the secure connection between the first client computing device and the second client computing device, wherein the first transport protocol role and the second transport protocol role are determined independently from the first security protocol role and the second security protocol role.

2. The method of claim 1, further comprising:
   establishing a transport connection between the first client computing device and the second client computing device via the intermediary computing device.

3. The method of claim 2, further comprising establishing the transport connection using Transmission Control Protocol (TCP).

4. The method of claim 3, further comprising establishing the transport connection using TCP stitching.

5. The method of claim 4, wherein establishing the transport connection further comprises:
   receiving, at the intermediary computing device from the first client computing device, a first synchronize (SYN) message including a first Internet Protocol (IP) address and a first port number corresponding to the first client computing device;
   receiving, at the intermediary computing device from the second client computing device, a second SYN message including a second IP address and a second port number corresponding to the second client computing device;
   modifying, at the intermediary computing device, (i) the first IP address and the first port number to include an IP address and a port number of the intermediary computing device and (ii) a destination IP address and the destination port number of the first SYN message to include the second IP address and the second port number; and
   transmitting, from the intermediary computing device, the modified first SYN message to the second computing device.

6. The method of claim 2, wherein establishing the transport connection further comprises:
   assigning a client role to the first transport protocol role;
   assigning a client role to the second transport protocol role; and
   assigning a server role to a transport connection role implemented by the intermediary computing device.

7. The method of claim 2, wherein establishing the transport connection further comprises:
   receiving, at the intermediary computing device from the first client computing device, a request for a transport connection with the second client computing device;
   transmitting, from the intermediary computing device, the request for a transport connection to the second client computing device;
   receiving, at the intermediary computing device from the second client computing device, a response to the request for a transport connection; and
   transmitting, from the intermediary computing device, the response to the request for a transport connection to the first client computing device.

8. The method of claim 1, wherein the first security protocol role is a client/server role and the second security protocol role is one of a client role or a server role.

9. The method of claim 8, further comprising assigning a client role to the first security protocol role if the second security protocol role is a server role.

10. The method of claim 8, further comprising assigning a server role to the first security protocol role if the second security protocol role is a client role.

11. The method of claim 1, wherein the first security protocol role is a client role and the second security protocol role is a server role.

12. The method of claim 1, wherein the first security protocol role is a server role and the second security protocol role is a client role.

13. The method of claim 8, further comprising determining the second security protocol role according to a preconfigured value.

14. The method of claim 1, further comprising establishing the secure connection using Transport Layer Security (TLS).

15. The method of claim 1, further comprising encoding at least one of the first transport protocol role or the second transport protocol role within a Session Description Protocol (SDP) attribute.

16. The method of claim 1, further comprising encoding at least one of the first security protocol role or the second security protocol role within an SDP attribute.

17. The method of claim 1, further comprising encoding the request for a secure connection within a Session Initiation Protocol (SIP) INVITE message.

18. The method of claim 1, further comprising encoding the response to the request for a secure connection within a SIP 200 OK message or a SIP 18×response message.

19. A system for establishing secure communications sessions between client computing devices located behind network security devices, the system comprising:

a computing device configured to:

(a) receive, from a first client computing device, a request for a secure connection with a second client computing device, the request including a first transport protocol role implemented by the first client computing device and a first security protocol role implemented by the first client computing device;

(b) transmit the request to the second client computing device;

(c) receive, from the second client computing device, a response to the request, the response including a second transport protocol role implemented by the second client computing device and a second security protocol role implemented by the second client computing device, the second security protocol role being different from the first security protocol role;

(d) transmit the response to the first client computing device; and (e) establish the secure connection between the first client computing device and the second client computing device, wherein the first transport protocol role and the second transport protocol role are determined independently from the first security protocol role and the second security protocol role.

20. A computer program product, tangibly embodied in a computer-readable storage medium, for establishing secure communications sessions between client computing devices located behind network security devices, the computer program product including instructions operable to cause a data processing apparatus to:

(a) receive, from a first client computing device, a request for a secure connection with a second client computing device, the request including a first transport protocol role implemented by the first client computing device and a first security protocol role implemented by the first client computing device;

(b) transmit the request to the second client computing device;

(c) receive, from the second client computing device, a response to the request, the response including a second transport protocol role implemented by the second client computing device and a second security protocol role implemented by the second client computing device, the second security protocol role being different from the first security protocol role;

(d) transmit the response to the first client computing device;

(e) establish the secure connection between the first client computing device and the second client computing device, wherein the first transport protocol role and the second transport protocol role are determined independently from the first security protocol role and the second security protocol role.

\* \* \* \* \*